(12) United States Patent
Spengler

(10) Patent No.: US 9,563,541 B2
(45) Date of Patent: Feb. 7, 2017

(54) SOFTWARE DEFECT DETECTION IDENTIFYING LOCATION OF DIVERGING PATHS

(71) Applicant: Michael Spengler, Heidelberg (DE)

(72) Inventor: Michael Spengler, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/697,254

(22) Filed: Apr. 27, 2015

(65) Prior Publication Data

US 2016/0314061 A1 Oct. 27, 2016

(51) Int. Cl.
 G06F 9/44 (2006.01)
 G06F 11/36 (2006.01)
 G06F 11/34 (2006.01)

(52) U.S. Cl.
 CPC ....... *G06F 11/3668* (2013.01); *G06F 11/3476* (2013.01); *G06F 11/3612* (2013.01); *G06F 2201/865* (2013.01)

(58) Field of Classification Search
 None
 See application file for complete search history.

(56) References Cited

U.S. PATENT DOCUMENTS

| | | | | |
|---|---|---|---|---|
| 5,740,359 A * | 4/1998 | Hasegawa | ........... | G06F 11/1438 714/47.3 |
| 5,778,169 A * | 7/1998 | Reinhardt | ........... | G06F 11/3696 714/38.1 |
| 5,905,855 A * | 5/1999 | Klaiber | ............... | G06F 11/3688 714/31 |
| 6,513,154 B1 * | 1/2003 | Porterfield | ................ | G06F 8/20 717/101 |

(Continued)

OTHER PUBLICATIONS

Database Defintion—Posted by Rouse—located at http://searchsqlserver.techtarget.com/definition/database 2016.*

(Continued)

*Primary Examiner* — Wei Zhen
*Assistant Examiner* — Hossain Morshed
(74) *Attorney, Agent, or Firm* — Fountainhead Law Group P.C.

(57) ABSTRACT

Embodiments detect differences between software systems by comparing statements collected therefrom in an order of execution. Highlighting point(s) of divergence between the executed statements allows rapid localization of differences between the software systems, which may be minor and otherwise difficult to discern within large volumes of underlying code. In some embodiments a highlighted departure in statement order may be attributable to slight code differences between the two software systems. In other embodiments the software systems may have identical code but reference different configuration data (e.g. as configuration files), a subtle distinction also revealed by comparing an order of executed statements. Certain embodiments may perform tracing/comparison between an order of execution of only selected statement types (e.g., SQL operations, database access, kernel events) based upon their specificity and ability to reveal significant functional differences. This can reduce processing and/or memory burden(s) when comparing lengthy volumes of executed statements between complex systems.

18 Claims, 17 Drawing Sheets

(56) References Cited

U.S. PATENT DOCUMENTS

| | | | | |
|---|---|---|---|---|
| 6,826,750 B1* | 11/2004 | Curtis | G06F 9/44536 | 717/170 |
| 7,124,401 B2* | 10/2006 | Muller | G06F 11/3684 | 714/E11.208 |
| 7,386,839 B1* | 6/2008 | Golender | G06F 11/3636 | 717/127 |
| 7,530,056 B1* | 5/2009 | Yaari | G06F 11/3604 | 717/128 |
| 7,840,787 B2* | 11/2010 | De Pauw | G06F 11/3636 | 712/227 |
| 7,930,683 B2* | 4/2011 | Li | G06F 8/71 | 717/124 |
| 8,082,425 B2* | 12/2011 | Sudhakar | G06F 9/3824 | 712/226 |
| 8,239,836 B1* | 8/2012 | Franz | G06F 11/1487 | 717/127 |
| 8,732,664 B2* | 5/2014 | Altin | G06F 9/4435 | 717/107 |
| 8,832,660 B2* | 9/2014 | Lindo | G06F 11/0778 | 711/155 |
| 8,990,784 B2* | 3/2015 | Anton | G06F 11/362 | 717/131 |
| 2001/0056571 A1* | 12/2001 | Pennello | G06F 11/3636 | 717/124 |
| 2008/0320437 A1* | 12/2008 | Maennel | G06F 11/3604 | 717/105 |
| 2009/0138853 A1* | 5/2009 | Orrick | G06F 11/362 | 717/124 |
| 2014/0189256 A1* | 7/2014 | Kranich | G06F 9/526 | 711/147 |

OTHER PUBLICATIONS

NPL—Lindahl-Hardware Trace Data—2005, located at http://www.drdobbs.com/embedded-systems/using-trace-to-debug-real-time-systems/229100158, Published in 2005.*

NPL—Computer-Hope-Linux and Unix diff command help and example—2014, located at http://www.computerhope.com/unix/udiff.htm, captured in 2014.*

NPL—Lindahl-Hardware Trace Data—2005, Article title: Using Trace to debug Real-time systems, located at: http://www.drdobbs.com/embedded-systems/using-trace-to-debug-real-time-systems/229100158 2005.*

Section 26.7. trace—Trace or Track Python statement execution, retrieved from the internet at: https://docs.python.org/2/library/trace.html, Printed and retrieved on Mar. 11, 2015.

* cited by examiner

```
12  CLASS defect_localization_sketch IMPLEMENTATION.
13    METHOD provide_fibonacci_numbers.
14      DATA:
15        li_counter              TYPE i,
16        li_summand1             TYPE i,
17        li_summand2             TYPE i,
18        li_sum                  TYPE i.
19
20      li_summand1 = 0.
21      li_summand2 = 1.
22      APPEND li_summand1 TO fibonacci_numbers.
23      APPEND li_summand2 TO fibonacci_numbers.
24
25      DO.
26        ADD 1 TO li_counter.
27        li_sum = li_summand1 + li_summand2.
28        APPEND li_sum TO fibonacci_numbers.
29        IF syst_spec_num_of_iterations = li_counter.
30          RETURN.
31        ENDIF.
32        li_summand1 = li_summand2.
33        li_summand2 = li_sum.
34      ENDDO.
35    ENDMETHOD.
36
37  ENDCLASS.
```

FIG. 3A

```
12  CLASS tc_defect_localization_sketch IMPLEMENTATION.
13    METHOD test_provide_fibonacci_numbers.
14      DATA:
15        expected_result TYPE if_defect_localization_sketch=>tt_table_of_numbers,
16        actual_result   TYPE if_defect_localization_sketch=>tt_table_of_numbers.
17
18      APPEND 0  TO expected_result.
19      APPEND 1  TO expected_result.
20      APPEND 1  TO expected_result.
21      APPEND 2  TO expected_result.
22      APPEND 3  TO expected_result.
23      APPEND 5  TO expected_result.
24      APPEND 8  TO expected_result.
25      APPEND 13 TO expected_result.
26
27      CREATE OBJECT class_under_test.
28
29    * we simulate an access to a configuration / customizing table in here
30      IF sy-sysid EQ 'FH0'.
31        class_under_test->syst_spec_num_of_iterations = 6.
32      ELSEIF sy-sysid EQ 'F5V'.
33        class_under_test->syst_spec_num_of_iterations = 5.
34      ENDIF.
35
36      actual_result = class_under_test->provide_fibonacci_numbers( ).
37
38      cl_abap_unit_assert=>assert_equals(
39        msg = '<file path of statement sequence of this test run>'
40        exp = expected_result
41        act = actual_result ).
42    ENDMETHOD.
43  ENDCLASS.
```

FIG. 3B

| FHD | F5V |
|---|---|
| class:     defect_localization_sketch<br>method:   provide_fibonacci_numbers<br>li_summand1 = 0.<br>li_summand2 = 1.<br>APPEND li_summand1 TO fibonacci_numbers.<br>APPEND li_summand2 TO fibonacci_numbers.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>RETURN. | class:     defect_localization_sketch<br>method:   provide_fibonacci_numbers<br>li_summand1 = 0.<br>li_summand2 = 1.<br>APPEND li_summand1 TO fibonacci_numbers.<br>APPEND li_summand2 TO fibonacci_numbers.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>RETURN. |

FIG. 3C

```
29  IF syst_spec_num_of_iterations = li_counter.
30      RETURN.
31  ENDIF.
32  li_summand1 = li_summand2.
```

FIG. 3D

```
12  CLASS defect_localization_sketch IMPLEMENTATION.
13    METHOD provide_fibonacci_numbers.
14      DATA:
15        li_counter  TYPE i,
16        li_summand1 TYPE i,
17        li_summand2 TYPE i,
18        li_sum      TYPE i.
19
20      li_summand1 = 0.
21      li_summand2 = 1.
22      APPEND li_summand1 TO fibonacci_numbers.
23      APPEND li_summand2 TO fibonacci_numbers.
24
25      DO.
26        ADD 1 TO li_counter.
27        li_sum = li_summand1 + li_summand2.
28        APPEND li_sum TO fibonacci_numbers.
29        IF li_counter EQ 6.
30          RETURN.
31        ENDIF.
32        li_summand1 = li_summand2.
33        li_summand2 = li_sum.
34      ENDDO.
35    ENDMETHOD.
36
37  ENDCLASS.
```

FIG. 3E

```
12  CLASS defect_localization_sketch IMPLEMENTATION.
13    METHOD provide_fibonacci_numbers.
14      DATA:
15        li_counter  TYPE i,
16        li_summand1 TYPE i,
17        li_summand2 TYPE i,
18        li_sum      TYPE i.
19
20      li_summand1 = 0.
21      li_summand2 = 1.
22      APPEND li_summand2 TO fibonacci_numbers.
23
24      DO.
25        ADD 1 TO li_counter.
26        li_sum = li_summand1 + li_summand2.
27        APPEND li_sum TO fibonacci_numbers.
28        IF li_counter EQ 6.
29          RETURN.
30        ENDIF.
31        li_summand1 = li_summand2.
32        li_summand2 = li_sum.
33      ENDDO.
34    ENDMETHOD.
35
36  ENDCLASS.
```

FIG. 3F

| FHD | F5V |
|---|---|
| class: defect_localization_sketch<br>method: provide_fibonacci_numbers<br>li_summand1 = 0.<br>li_summand2 = 1.<br>APPEND li_summand1 TO fibonacci_numbers.<br>APPEND li_summand2 TO fibonacci_numbers.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>RETURN. | class: defect_localization_sketch<br>method: provide_fibonacci_numbers<br>li_summand1 = 0.<br>li_summand2 = 1.<br>APPEND li_summand2 TO fibonacci_numbers<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>li_summand1 = li_summand2.<br>li_summand2 = li_sum.<br>ADD 1 TO li_counter.<br>li_sum = li_summand1 + li_summand2.<br>APPEND li_sum TO fibonacci_numbers.<br>RETURN. |

FIG. 3G

```
20  li_summand1 = 0.
21  li_summand2 = 1.
22  APPEND li_summand1 TO fibonacci_numbers.
23  APPEND li_summand2 TO fibonacci_numbers.
```

FIG. 3H

```
CLASS cl_atrapi_main_service DEFINITION
  PUBLIC
  CREATE PUBLIC.

PUBLIC SECTION.

INTERFACES:
      if_atrapi_main_service.

CLASS-METHODS:
      s_get_instance
        RETURNING
          value(r_ref_instance) TYPE REF TO if_atrapi_main_service, is_new_analyzer_available
        returning
          value(r_available) type xflag.

private section.

class-data S_REF_MAIN type ref to CL_ATRAPI_MAIN_SERVICE .
    data REF_TRACING_SERVICE type ref to IF_ATRAPI_TRACING_SERVICE .
    data REF_FILE_SERVICE type ref to IF_ATRAPI_TRACE_FILE_SERVICE .
    data REF_ANALYSIS_SERVICE type ref to IF_ATRAPI_ANALYSIS_SERVICE .
    data REF_REQUEST_SERVICE type ref to IF_ATRAPI_TRACE_REQ_SERVICE .
    data REF_PARAMS_SERVICE type ref to IF_ATRAPI_TRACE_PARAMS_SERVICE .
    data ref_variant_service TYPE REF TO if_atrapi_variant_service.

methods INIT.

ENDCLASS.

CLASS CL_ATRAPI_MAIN_SERVICE IMPLEMENTATION.

METHOD if_atrapi_main_service~get_analysis_service.

r_ref_analysis_service = me->ref_analysis_service.

ENDMETHOD.

method if_atrapi_main_service~get_current_server.

r_server = cl_atra_cross_server=>s_get_instance(
      )->get_current_server( i_flg_to_lower = 'X' ).

ENDMETHOD.
```

FIG. 3I1

```
METHOD if_atrapi_main_service~get_server_list.
    r_tab_server = cl_atra_cross_server=>s_get_instance(
      )->get_server_list( i_flg_to_lower_case = i_flg_to_lower_case ).
ENDMETHOD.

METHOD if_atrapi_main_service~get_trace_file_service.
    r_ref_file_service = me->ref_file_service.
ENDMETHOD.

METHOD if_atrapi_main_service~get_trace_params_service.
    r_ref_params_service = me->ref_params_service.
ENDMETHOD.

METHOD if_atrapi_main_service~get_trace_request_service.
    r_ref_request_service = me->ref_request_service.
ENDMETHOD.

method if_atrapi_main_service~get_trace_variant_service.
    r_ref_variant_sercive = me->ref_variant_service.
ENDMETHOD.

METHOD if_atrapi_main_service~get_tracing_service.
    r_ref_tracing_service = me->ref_tracing_service.
ENDMETHOD.

METHOD init.
    me->ref_file_service      = lcl_file_service=>s_get_instance( ).
    me->ref_analysis_service  = lcl_analysis_service=>s_get_instance(
    me->ref_tracing_service   = lcl_tracing_service=>s_get_instance(
```

FIG. 312

```
        me->ref_request_service      ?= me->ref_tracing_service.
        me->ref_params_service       = lcl_params_service->s_get_instance( ).
        me->ref_variant_service      = lcl_variant_service->s_get_instance(
).

ENDMETHOD.

METHOD IS_NEW_ANALYZER_AVAILABLE.

data:
        l_flg_no_kernel type xflag.

get parameter id 'ATRAPI_NO_KERNEL' field l_flg_no_kernel.
      if l_flg_no_kernel is not initial.
        return.
      endif.

if cl_atra_analyzer=>IF_ATRA_ANALYZER~IS_AVAILABLE( ) is not initial.
        r_available = 'X'.
      endif.

ENDMETHOD.

METHOD s_get_instance.

IF s_ref_main IS INITIAL.
        CREATE OBJECT s_ref_main TYPE cl_atrapi_main_service.
        s_ref_main->init( ).
        cl_abap_trace_data=>reorganize( ).
      ENDIF.

r_ref_instance = s_ref_main.

ENDMETHOD.
ENDCLASS.
```

SOFTWARE DEFECT DETECTION IDENTIFYING LOCATION OF DIVERGING PATHS

BACKGROUND

Unless otherwise indicated herein, the approaches described in this section are not prior art to the claims in this application and are not admitted to be prior art by inclusion in this section.

Embodiments relate to software testing, and in particular, to detecting defects in software by identifying location of diverging paths of execution.

Over its lifetime, a software program may be present in a number of different versions. For example, an early version of software comprising a development system may be used for purposes of initial development. Later, another version of the software may be utilized for testing and/or evaluation.

Often, the structure of various software versions (e.g., development system, test system) may differ from each other in subtle ways. In particular, even minor differences in code can substantially impact performance of the software in important ways.

For example, a developer may realize that while a certain software feature works well in one version (e.g., a development system), that same feature may operate differently in a different version (e.g. test system). Unfortunately the task of precisely manually identifying subtle differences in code giving rise to deviation in software performance, can be laborious and expensive.

Moreover, this issue can be exacerbated as software programs become ever more complex. For example, programs for deployment on the cloud may be configured to work with a variety of different client types. Such cloud-based software may thus utilize the combination of different code modules with different versions. Subtle differences in code between those modules can lead to unwanted deviations in performance between versions.

SUMMARY

Embodiments of methods and systems detect differences between software systems (e.g., test systems, development systems), or within one software system between two different points in time, by comparing statements collected therefrom in an order of execution. Highlighting point(s) of divergence between the executed statements allows rapid localization of differences between the software systems, which may be minor and otherwise difficult to discern within large volumes of underlying code. For example, in some embodiments a highlighted departure in statement order may be attributable to slight differences in code between the two software systems. In other embodiments, however, the software systems may have identical code but reference different configuration data (e.g. in the form of configuration files), a subtle distinction but one that is also revealed by comparing an order of executed statements. Certain embodiments may perform tracing/comparison between an order of execution of only selected statement types (e.g., SQL operations, database access, kernel events) based upon their specificity and ability to reveal significant functional differences. This can reduce processing and/or memory burden(s) when comparing lengthy volumes of executed statements between complex systems. In this respect, embodiments can allow flexible big data based code quality assurance.

An embodiment of a computer-implemented method comprises an engine recording in a database, a first file (or another data storage object) comprising first (sequence of) statements in an order of execution by a first software system. The engine records in the database, a second file (or another data storage object) comprising second (sequence of) statements in an order of execution by a second software system. The engine records in the database, a comparison file indicating a point of divergence between the first statements and the second statements. The engine communicates the point of divergence to a user.

A non-transitory computer readable storage medium embodies a computer program for performing a method comprising an engine recording in a database, a first file comprising first statements in an order of execution by a first software system. The engine records in the database, a second file comprising second statements in an order of execution by a second software system. The engine records in the database, a comparison file terminating at a point of divergence between the first statements and the second statements. The engine communicates the point of divergence to a user.

An embodiment of a computer system comprises one or more processors and a software program, executable on said computer system. The software program is configured to cause an engine to record in a database, a first file comprising first statements of a first type in an order of execution by a first software system. The engine records in the database, a second file comprising second statements of the first type in an order of execution by a second software system. The engine records in the database, a comparison file indicating a point of divergence between the first statements and the second statements. The engine communicates the point of divergence to a user.

In certain embodiments the first statements comprise all statements executed by the first software system up to and including the point of divergence, and the second statements comprise all statements executed by the second software system up to and including the point of divergence.

Some embodiments further comprise the engine receiving an input selecting a statement type, wherein the first statements comprise only statements of the statement type executed by the first software system up to and including the point of divergence, and the second statements comprise only statements of the statement type executed by the second software system up to and including the point of divergence.

In particular embodiments the statement type comprises a database access.

In various embodiments the point of divergence is attributable to a difference in code between the first software system and the second software system.

According to particular embodiments wherein the point of divergence is attributable to a difference in configuration file referenced by the first software system and the second software system.

In some embodiments the comparison file terminates at the point of divergence.

In certain embodiments the comparison file indicates the point of divergence with a text size, a text font, a text color, and/or a background color.

In some embodiments the comparison file includes a sequence number.

In various embodiments the comparison file includes an execution time.

The following detailed description and accompanying drawings provide a better understanding of the nature and advantages of embodiments.

BRIEF DESCRIPTION OF THE DRAWINGS

FIGS. 3A-3K illustrate various aspects of specific examples of software defect detection according to an embodiment.

DETAILED DESCRIPTION

Described herein are systems and methods detecting software defects, and in particular to systems identifying location of diverging paths between different software versions according to various embodiments. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments of methods and systems detect differences between software systems by comparing statements collected therefrom in an order of execution. Highlighting point(s) of divergence between the executed statements allows rapid localization of differences between the software systems, which may be minor and otherwise difficult to discern within large volumes of underlying code. For example, in some embodiments a highlighted departure in statement order may be attributable to slight differences in code between the two software systems. In other embodiments, however, the software systems may have identical code but reference different configuration files, a subtle distinction but one that is also revealed by comparing an order of executed statements. Certain embodiments may perform tracing/comparison between an order of execution of only selected statement types (e.g., SQL operations, database access, kernel events) based upon their specificity and ability to reveal significant functional differences. This can reduce processing and/or memory burden(s) when comparing lengthy volumes of executed statements between complex systems.

Figure 1:
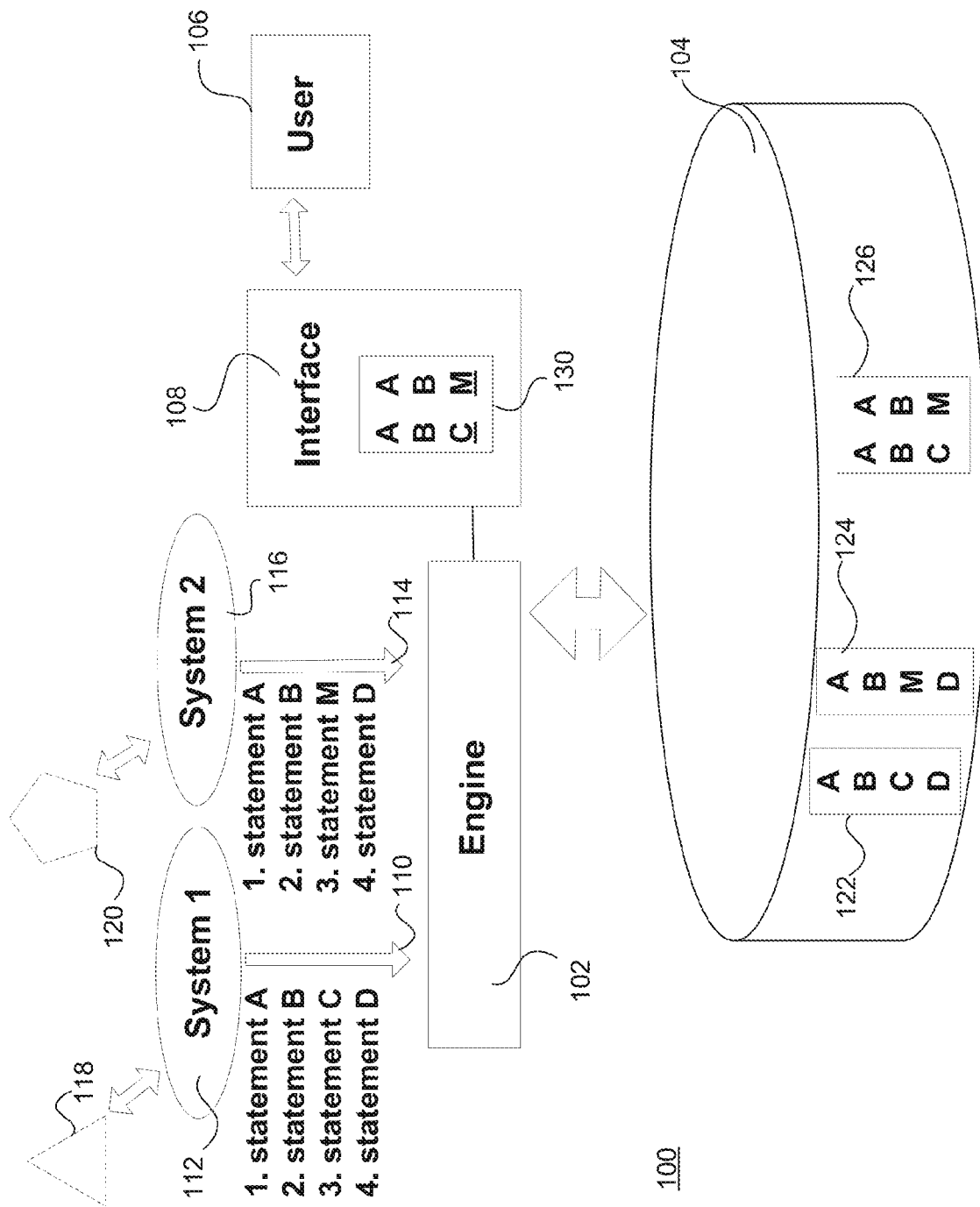
FIG. 1 is a simplified view of an embodiment of a system according to an embodiment.

FIG. 1 presents a simplified view of a system according to an embodiment. System 100 comprises an engine 102 that is in communication with a database 104, and in communication with a user 106 via an interface 108.

The engine is in communication with a first software system 112 and a second software system 116. The code of software systems 112 and 116 may be nearly similar or even identical, but a deviation in operation of the software systems under the same conditions has occurred. The underlying source of this operational deviation is sought to be discovered and then corrected.

Accordingly, the engine is configured to receive statements 110 in an order of execution from a first software system 112. The engine is also configured to receive statements 114 in an order of execution from a second software system 116.

Such tracking of order of statement execution by the different software systems, may be accomplished in various ways. In one example, the trace module of the PYTHON® programming language allows tracing of program execution. As discussed in the example below, another example of such functionality allowing the tracking of statement order, is afforded in the ABAP programming language.

Here, an order of executed statements (A,B,C) received from the first system is different from an order of executed statements (A,B,M) received from the second system. Under some circumstances this divergence in order of statement execution may be attributable to code difference(s) between the two systems. Under other circumstances, however, the systems may have identical code and the divergence in order of statement execution may be attributable to referencing of different configuration files 118, 112, respectively.

The engine then records in an underlying storage medium (e.g., database 104), files 122 and 124 reflecting the order of execution of statements by the respective systems. As discussed further in the example below, the titles of these recorded files may be according to a specific naming convention specifying their origin.

The engine then processes the respective files to identify a departure point of the recorded executed statements. In this highly simplified example, comparison of the recorded files indicates a point of divergence (C versus M) at the third executed statement. File 126 is recorded reflecting this comparison.

FIG. 1 then shows the engine communicating the results of the comparison file to the interface, in the form of a display 130 highlighting the point of departure (C versus M). This information allows the user to identify with precision, the locality (e.g., code, referenced configuration file) in the structure of the systems that may be responsible for a difference in behavior between them.

Figure 2:
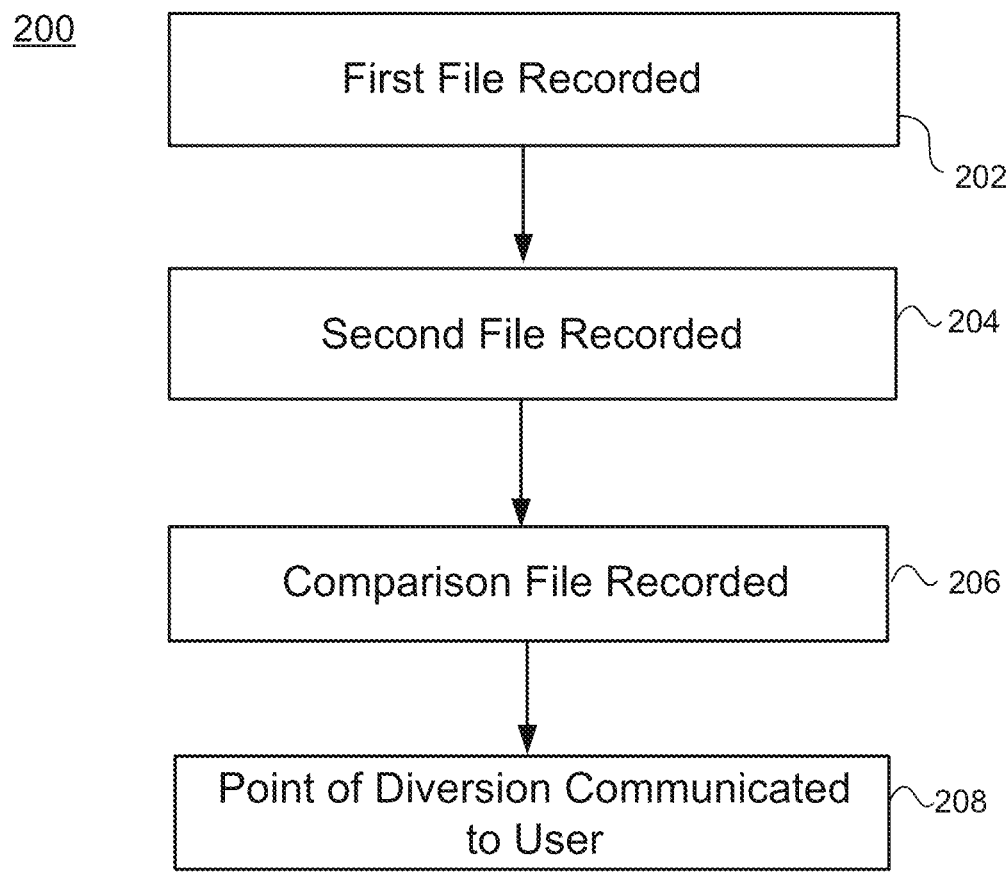
FIG. 2 is a simplified flow diagram of a process according to an embodiment.

FIG. 2 is a simplified flow diagram showing a method 200 of software defect detection according to an embodiment. In a first step 202, an engine records in a first file, statements from a first system in an order of execution.

In a second step 204, the engine records in a second file, statements from a second system in an order of execution. In a third step 206, the engine records a comparison file highlighting a point of divergence between the order of execution of statements from the first file, and the order of execution of statements from the second file.

The comparison file may highlight differences in executed statement order between the two systems, in various ways. In some embodiments, a predetermined number of consistent executed statements between the two systems leading up to the point of divergence may be depicted, with the final (terminal) displayed line corresponding to the point of divergence. This concluding statement in the recorded file thus clearly indicates the point of divergence between the software systems.

Other techniques may be employed alone or in combination to additionally notify a user about difference(s) in an order of executed statements. Examples of such affordances can include but are not limited to the use of italics, bolding, underlining, font, font size, text color, background shading/coloring, or even animations.

In certain embodiments the content of the comparison file may include the text of the executed statements. Some embodiments may include a sequence number of the executed statements. In some embodiments information in addition to the executed statement(s) may be presented in the comparison file, including but not limited to:

sequence number;
execution time;
referenced files (e.g., configuration files, database files);
code remarks;
software internal structure information.

In a fourth step 208, the engine provides a display of the point of divergence to a user.

Further details regarding approaches to software defect detection are now provided in connection with certain examples relating to software available from SAP SE, of Walldorf Germany. Specifically, in these particular examples defect detection is implemented via the ABAP programming language utilized to interact with an underlying database.

EXAMPLE 1

Configuration Difference

The class defect_localization_sketch illustrates one aspect of the defect localization by diverging paths. This class stands for the program under test, and is shown in FIG. 3A.

In this example the class contains the method: provide_fibonacci_numbers.
This method provides fibonacci numbers, where the number of iterations depends on a specific configuration of a particular system (e.g., FHD or F5V).

FIG. 3B shows testing the class DEFECT_LOCALIZATION_SKETCH for the method "provide_fibonacci_numbers". This test runs successfully with the implementation shown in FIG. 3A, only where the system-specific configuration contains "6" iterations.

That is, in a system FHD→"6" is configured, and the test runs successfully. By contrast in a system F5V→"5" is configured, and the test fails.

In order to determine the source of this failure, this example collects the statements generated in order by the two systems. In particular, these ordered statements collected from the FHD system are saved as:
/root/defect_localization_repository/tc_defect_localization_sketch/FHD_SPENGLERM_<timestamp>.

The ordered statements collected from the F5V system are saved as:
/root/defect_localization_repository/tc_defect_localization_sketch/F5V_SPENGLERM_<timestamp>.

Comparison of these files may permit ready identification of the localized source of the defect. This comparison is shown in FIG. 3C.

Here, the earliest different statement is: (li_summand1=li_summand2 vs. return). As shown in FIG. 3D, this comparison focuses the developer's attention directly to the source of the error, revealing that the value of the system-specific number of iterations is different between the two systems.

EXAMPLE 2

Code Difference

As mentioned above, divergence in statement order can also be utilized to detect differences in code between two systems. This example illustrates such a use, again in connection with the generation of Fibonacci numbers.

FIG. 3E shows implementation of the class defect_localization_sketch in system FHD representing the program under test. This class contains the method: provide_fibonacci_numbers.

Here, the implementation (code) differs slightly between the program version in the system FHD (FIG. 3E), and the program version in the system F5V shown in FIG. 3F.

FIG. 3B again shows testing the class DEFECT_LOCALIZATION_SKETCH for method "provide_fibonacci_numbers". In this example, the test runs successfully with the implementation shown in the system FHD of FIG. 3E, but does not run successfully in the system F5V of FIG. 3F.

In order to determine the source of this failure, this example collects the statements generated in order by the two systems. In particular, these ordered statements collected from the FHD system are saved as:
/root/defect_localization_repository/tc_defect_localization_sketch/FHD_SPENGLERM_<timestamp>.

The ordered statements collected from the F5V system of are saved as:
/root/defect_localization_repository/tc_defect_localization_sketch/FHD_SPENGLERM_<timestamp>

Comparison of these files may permit ready identification of the localized source of the defect. This is shown in FIG. 3G.

Here, the earliest diverging statement is: (1 APPEND li_summand1 TO fibonacci_numbers. vs. APPEND li_summand2 TO fibonacci_numbers.). As shown in FIG. 3H, this comparison focuses the developer's attention directly on the localized source of the difference in code giving rise to the error.

In this example, the statements in the order of execution are recorded to a file utilizing the Append command. FIGS. 311-313 show code of one example of a software program configured to access these stored files in order to perform the analysis and generate the comparison file.

While the above example has discussed software defect detection based upon collecting all system statements in an order of their execution, this is not required. Some embodiments may instead collect for analysis, fewer than all of the statements in an order of their execution.

Figure 3J:
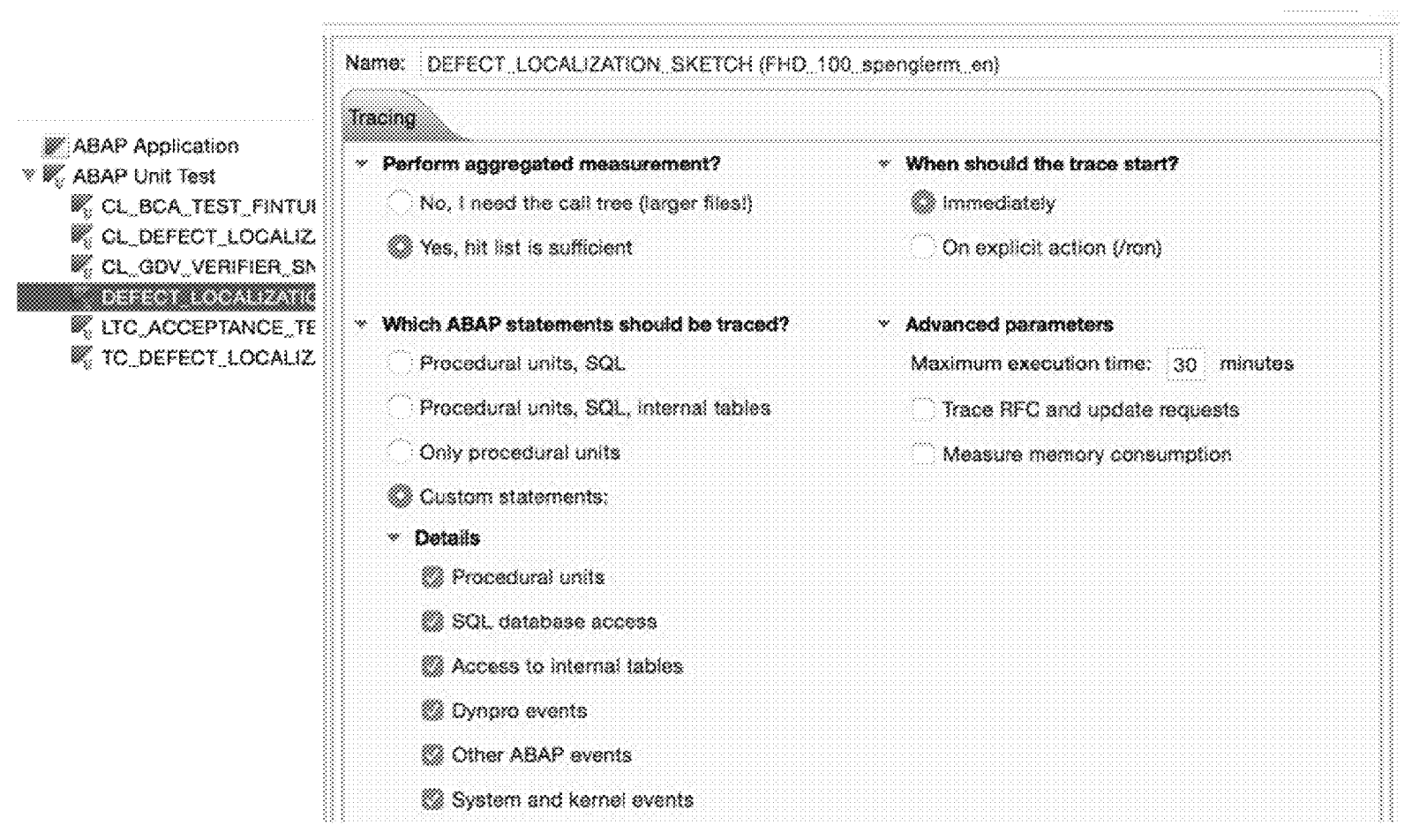

For example, FIG. 3J shows a screen shot of an interface affording the ability to select one or more of the following statements to trace:
 procedural units;
 SQL database access;
 access to internal tables;
 Dynpro (e.g., User Interface) events;
 other ABAP events;
 system and kernel events.

Figure 3K:
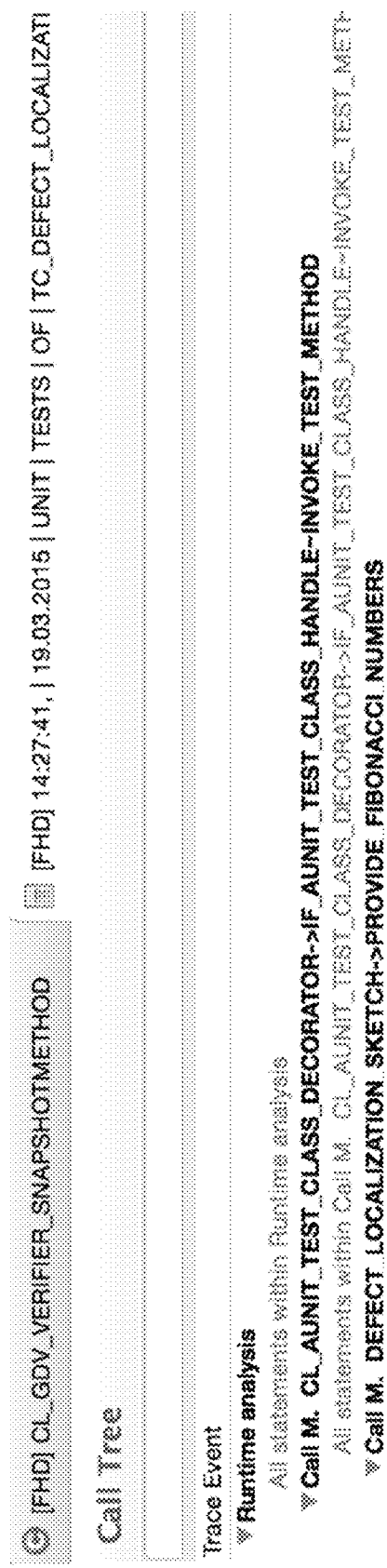

FIG. 3K shows a view of an example of a trace on the procedural unit level.

Conferring an ability to select only certain types of statement to trace, may be potentially useful in a number of scenarios. One is in the case of analyzing the behavior of extremely large/complex software programs, where a very large number of executed statements (including minor executed statements) may offer a challenge to memory and/or processing resources. By contrast, selecting only particular statements for tracing may reduce these burdens and enhance a user's ability to quickly recognize significant instances of localized diversion.

Figure 4:
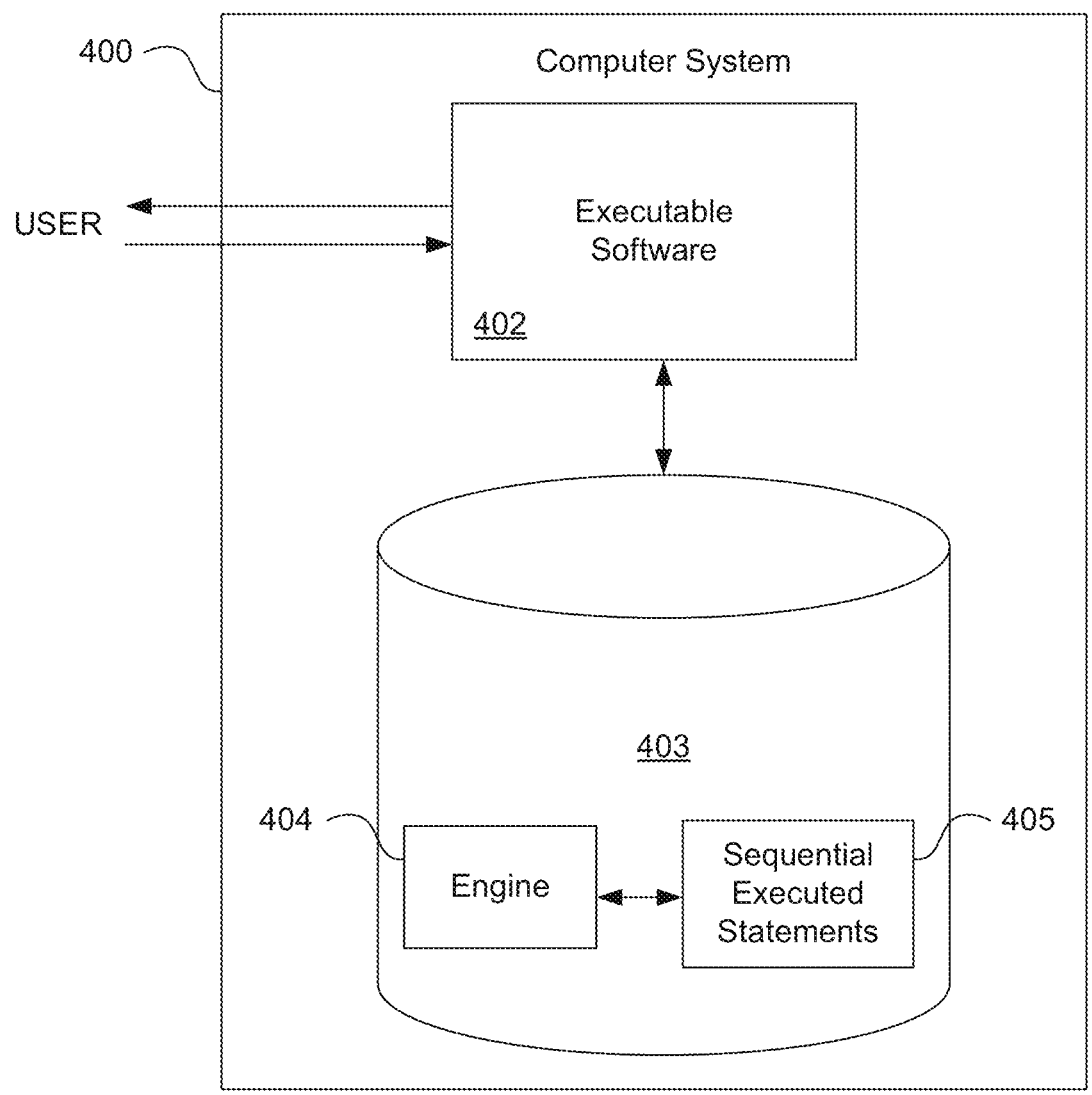
FIG. 4 illustrates hardware of a special purpose computing machine configured to perform software defect detection according to an embodiment.

FIG. 4 illustrates hardware of a special purpose computing machine configured to perform software defect detection according to an embodiment. In particular, computer system 400 comprises a processor 402 that is in electronic communication with a non-transitory computer-readable storage medium 403. This computer-readable storage medium 403 has stored thereon code 405 corresponding to sequential executed statements of different systems. Code 404 corresponds to an engine. Code 405 may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 4, the engine is shown as being part of a database. Such an embodiment can correspond to applications where processing is performed by a powerful engine available as part of an in-memory database (e.g., the HANA in-memory database available from SAP SE of Walldorf, Germany). However this is not required and in certain embodiments the engine may be implemented in other ways, for example as part of an overlying application layer.

Figure 5:
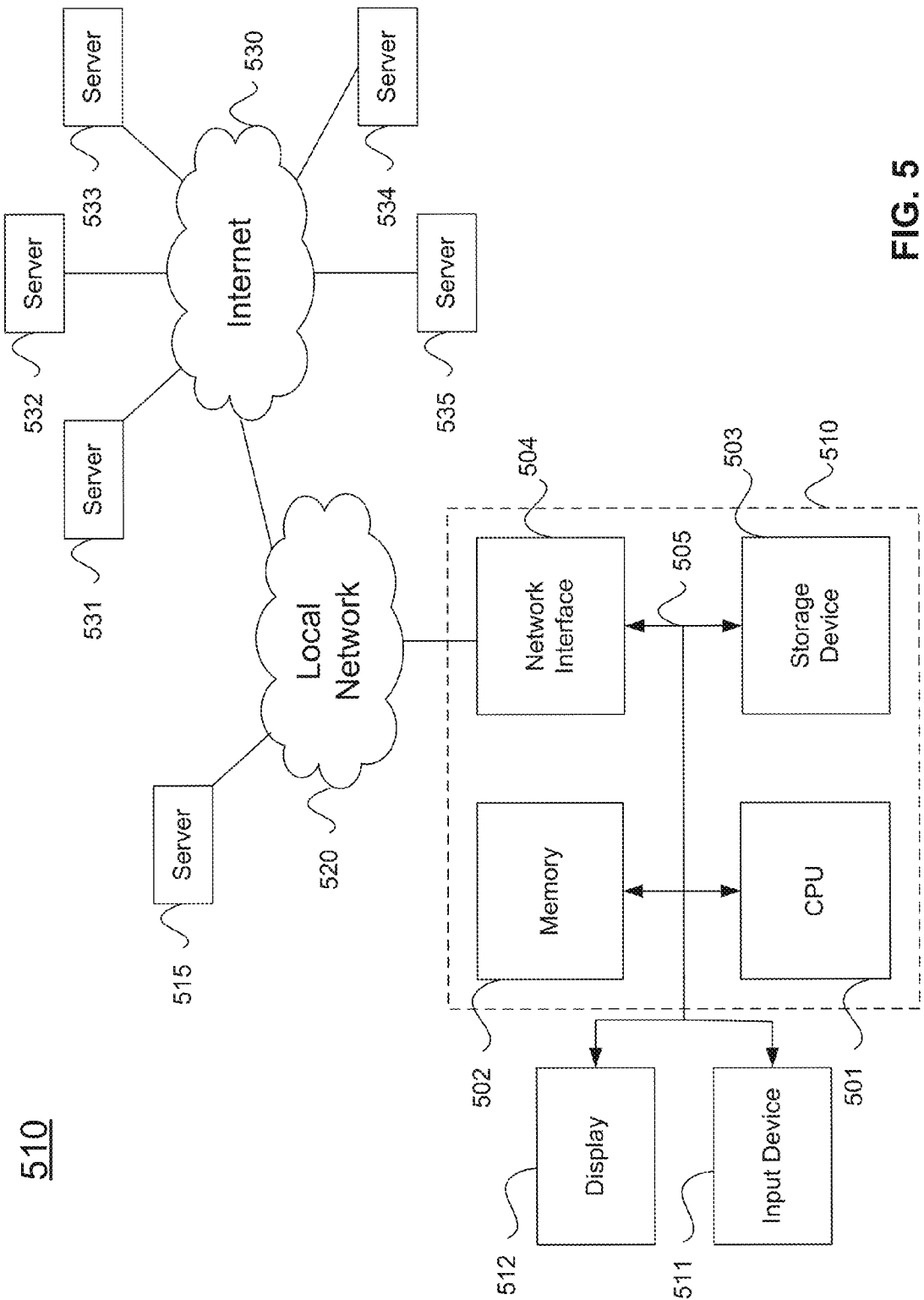
FIG. 5 illustrates an example of a computer system.

An example computer system 510 is illustrated in FIG. 5. Computer system 510 includes a bus 405 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device 503 and memory 502 are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface 504 is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   an engine, receiving an input selecting a type for executed source code ones to be recorded during the execution by the first software system and the second software system;
   the engine recording in a database, a first file comprising first executed source code lines in an order of execution by a first software system;
   the engine recording in the database, a second file comprising second executed source code lines in an order of execution by a second software system;
   the engine recording in the database, a comparison file indicating a point of divergence between the first executed source code lines and the second executed source code lines;
   and the engine communicating the point of divergence to a user, wherein the point of divergence specifies unwanted deviations in performance between the first and the second software systems;
   the first executed source code lines comprise only code lines of the selected type executed by the first software system up to and including the point of divergence;
   the second executed source code lines comprise only code lines of the selected type executed by the second software system up to and including the point of divergence, and the selected type comprises a database access.

2. A method as in claim 1, wherein the point of divergence corresponds to an earliest executed source code line by the first software system that is different from a correspondingly executed source code line by the second software system.

3. A method as in claim 2, wherein the point of divergence is attributable to a difference in source code lines associated with the first software system and the second software system, and wherein based on the point of divergence, a localized source of the difference is identified in the first source code for the first software system and the second source code in the second software system.

4. A method as in claim 1 wherein the point of divergence is attributable to a difference in a configuration file referenced by the first software system and the second software system.

5. A method as in claim 1 wherein the comparison file terminates at the point of divergence.

6. A method as in claim 1 wherein the comparison file indicates the point of divergence with one or more of a terminating line, a text size, a text font, a text color, and a background color.

7. A method as in claim 1 wherein the comparison file includes a sequence number.

8. A method as in claim 1 wherein the comparison file includes an execution time.

9. A non-transitory computer readable storage medium embodying a computer program for performing a method, said method comprising:
- an engine, receiving an input selecting a type for executed source code lines to be recorded during the execution by the first software system and the second software system;
- the engine recording in a database, a first the comprising first executed source code lines in an order of execution by a first software system;
- the engine recording in the database, a second the comprising second executed source code lines in an order of execution by a second software system;
- the engine recording in the database, a comparison the indicating a point of divergence between the first executed source code lines and the second executed source code ones;
- and the engine communicating the point of divergence to a user, wherein the point of divergence specifies unwanted deviations in performance between the first and the second software systems;

wherein,
- the first executed source code lines comprise only code ones of the selected type executed by the first software system up to and including the point of divergence;
- the second executed source code lines comprise only code lines of the selected type executed by the second software system up to and including the point of divergence, and the selected type comprises a database access.

10. A non-transitory computer readable storage medium as in claim 9, wherein the point of divergence corresponds to an earliest executed source code line by the first software system that is different from a correspondingly executed source code line by the second software system.

11. A non-transitory computer readable storage medium as in claim 10, wherein the point of divergence is attributable to a difference in source code lines associated with the first software system and the second software system, and wherein based on the point of divergence, a localized source of the difference is identified in the first source code for the first software system and the second source code in the second software system.

12. A non-transitory computer readable storage medium as in claim 9 wherein the point of divergence is attributable to a difference in a configuration file referenced by the first software system and the second software system.

13. A non-transitory computer readable storage medium as in claim 9 wherein:
- the comparison file indicates the point of divergence with a text size, a text font, a text color, and/or a background color; and
- the comparison file includes one or more of a sequence number and an execution time.

14. A computer system comprising: one or more processors; a software program, executable on said computer system, the software program configured to cause an engine to
- receive an input selecting a type for executed source code ones to be recorded during the execution by the first software system and the second software system;
- record in a database, a first the comprising first executed source code ones of a first type in an order of execution by a first software system;
- record in the database, a second the comprising second executed source code lines of the first type in an order of execution by a second software system;
- recording in the database, a comparison the indicating a point of divergence between the first executed source code ones and the second executed source code ones;
- and communicate the point of divergence to a user, wherein the point of divergence specifies unwanted deviations in performance between the first and the second software systems;

wherein,
- the first executed source code lines comprise only code lines of the selected type executed by the first software system up to and including the point of divergence;
- the second executed source code lines comprise only code lines of the selected type executed by the second software system up to and including the point of divergence, and the selected type comprises a database access.

15. A computer system as in claim 14 wherein the point of divergence corresponds to an earliest executed source code line by the first software system that is different from a correspondingly executed source code line by the second software system.

16. A computer system as in claim 15, wherein the point of divergence is attributable to a difference in source code lines associated with the first software system and the second software system, and wherein based on the point of divergence, a localized source of the difference is identified in the first source code for the first software system and the second source code in the second software system.

17. A computer system as in claim 14 wherein the point of divergence is attributable to a difference in a configuration file referenced by the first software system and the second software system.

18. A computer system as in claim 14 wherein the comparison file indicates the point of divergence with one or more of a terminating line, a text size, a text font, a text color, and a background color.

* * * * *